United States Patent
Dahl et al.

(10) Patent No.: US 11,686,259 B2
(45) Date of Patent: Jun. 27, 2023

(54) FOUR-STROKE INTERNAL COMBUSTION ENGINE AND METHOD OF CONTROLLING TIMINGS OF AN EXHAUST CAMSHAFT AND AN INTAKE CAMSHAFT

(71) Applicant: Scania CV AB, Södertälje (SE)

(72) Inventors: Andreas Dahl, Nyköping (SE); Håkan Sarby, Huddinge (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 17/769,366

(22) PCT Filed: Oct. 22, 2020

(86) PCT No.: PCT/SE2020/051025
§ 371 (c)(1),
(2) Date: Apr. 15, 2022

(87) PCT Pub. No.: WO2021/080499
PCT Pub. Date: Apr. 29, 2021

(65) Prior Publication Data
US 2023/0049122 A1    Feb. 16, 2023

(30) Foreign Application Priority Data
Oct. 23, 2019  (SE) .................... 1951201-1

(51) Int. Cl.
*F02D 41/14*    (2006.01)
*F02D 13/02*    (2006.01)
(Continued)

(52) U.S. Cl.
CPC ......... *F02D 13/0215* (2013.01); *F02D 13/04* (2013.01); *F02D 41/0007* (2013.01);
(Continued)

(58) Field of Classification Search
CPC .. F02D 13/0215; F02D 13/04; F02D 41/0007; F02D 41/1454; F02D 2041/001;
(Continued)

(56) References Cited

U.S. PATENT DOCUMENTS 6,105,555 A    8/2000  Weber et al.
8,714,123 B2   5/2014  Rollinger et al.
(Continued)

FOREIGN PATENT DOCUMENTS

EP   1242720 A1   9/2002
EP   2009264 A2   12/2008
(Continued)

OTHER PUBLICATIONS

Scania CV AB, International Patent Application No. PCT/SE2020/051025, International Preliminary Report on Patentability, dated Apr. 26, 2022.
(Continued)

*Primary Examiner* — Hai H Huynh
(74) *Attorney, Agent, or Firm* — Moore & Van Allen PLLC; W. Kevin Ransom

(57) ABSTRACT

The disclosure concerns an internal combustion engine comprising an exhaust camshaft, an intake camshaft, a turbocharger, and a control system. The turbocharger comprises a compressor. A timing of the exhaust camshaft and a timing of the intake camshaft are controllable by the control system, which is configured to: store a compressor map related to the compressor, store a reference area within the compressor map, and determine at least two parameters. In response to the at least two parameters indicating that a current operational point of the compressor is outside the reference area, the control system changes the timing of the
(Continued)

exhaust camshaft to advance closing of the exhaust valve, and the timing of the intake camshaft to delay opening of the intake valve.

17 Claims, 6 Drawing Sheets

(51) Int. Cl.
  *F02D 13/04*   (2006.01)
  *F02D 41/00*   (2006.01)
(52) U.S. Cl.
  CPC .... *F02D 41/1454* (2013.01); *F02D 2041/001* (2013.01); *F02D 2200/024* (2013.01); *F02D 2200/0406* (2013.01); *F02D 2200/0414* (2013.01); *F02D 2200/101* (2013.01)
(58) Field of Classification Search
  CPC ....... F02D 2200/024; F02D 2200/0406; F02D 2200/0414; F02D 2200/101
  USPC ................ 123/559.1, 90.15, 90.11; 60/605.1
  See application file for complete search history.

(56) References Cited

U.S. PATENT DOCUMENTS

| | | |
|---|---|---|
| 2004/0089278 A1 | 5/2004 | Ekenberg |
| 2011/0219767 A1 | 9/2011 | Miyashita |
| 2014/0366528 A1 | 12/2014 | Ricart-Ugaz et al. |

FOREIGN PATENT DOCUMENTS

| | | |
|---|---|---|
| EP | 2050943 A1 | 4/2009 |
| EP | 3315749 A1 | 5/2018 |
| SE | 1250143 A1 | 2/2013 |
| WO | 2008000899 A1 | 1/2008 |
| WO | 2010058082 A1 | 5/2010 |
| WO | 2017217908 A1 | 12/2017 |

OTHER PUBLICATIONS

Scania CV AB, International Patent Application No. PCT/SE2020/051025, International Search Report, dated Nov. 20, 2020.
Scania CV AB, International Patent Application No. PCT/SE2020/051025, Written Opinion, dated Nov. 20, 2020.
Scania CV AB, Swedish Patent Application No. 1951201-1, Final Notice, dated Apr. 17, 2020.

FOUR-STROKE INTERNAL COMBUSTION ENGINE AND METHOD OF CONTROLLING TIMINGS OF AN EXHAUST CAMSHAFT AND AN INTAKE CAMSHAFT

CROSS-REFERENCE TO RELATED APPLICATIONS

This application is a National Stage Patent Application (filed under 35 § U.S.C. 371) of PCT/SE2020/051025, filed Oct. 22, 2020 of the same title, which, in turn claims priority to Swedish Patent Application No. 1951201-1 filed Oct. 23, 2019 of the same title; the contents of each of which are hereby incorporated by reference.

FIELD OF THE INVENTION

The invention relates to a four-stroke internal combustion engine and to a method of controlling timings of an exhaust camshaft and an intake camshaft of a four-stroke internal combustion engine. The invention further relates to a vehicle comprising a four-stroke internal combustion engine. Moreover, the invention relates to a computer program and to a computer-readable storage medium.

BACKGROUND OF THE INVENTION

A turbocharger of an internal combustion engine, ICE, increases the density of the charge air being admitted into the ICE for combustion of a fuel within the ICE. An increased charge air density permits combustion of larger amounts of fuel, which in turn means that the ICE produces a higher power output than with uncompressed charge air. The turbocharger comprises a compressor and a turbine which are connected by a common shaft. The turbine is driven by the exhaust gas from the ICE.

A turbocharger of an ICE has an operating range which is matched in size for that particular ICE. Ideally, the turbocharger would be adapted to provide an optimal amount of charge air to the ICE over the entire operating range of the ICE. However, due to inter alia mechanical limitations of the turbocharger and the width of the operating range of the ICE, this it is not possible. Thus, in practice a well matched turbocharger provides at least sufficient charge air over a large part of the ICE operating range. That said, there are operating conditions, under which the turbocharger has limited performance. Under such operating conditions, the performance of the ICE is limited as well.

In order to increase the effective operating range of a turbocharger, it may be provided with a so-called wastegate. A wastegate forms a bypass of the turbine of the turbocharger. Thus, the amount of exhaust gas passing through the turbine may be controlled by opening and closing the wastegate, which permits the compressor of the turbocharger to be operated within its operating range. For instance, at higher engine speeds the wastegate may be opened in order to control the turbocharger speed, i.e. the energy flow to the turbine is reduced via the wastegate, and thus, the charge air pressure produced by the compressor is reduced.

Other ways of controlling the charge air pressure provided to an ICE have been proposed in WO 2010/058082 and US 2004/0089278.

WO 2010/058082 discloses a method of controlling turbocharger speed of a piston engine in which method the engine is operated below or at a predetermined load and combustion air is pressurized with the compressor part. The engine may be run in various modes of operation including one or more of bypassing charge air from the compressor to the turbine, advancing or delaying opening and closing of the valves utilizing a so-called lost motion mechanism according to WO 2008/000899.

US 2004/0089278 discloses an ICE with an exhaust-driven turbo compressor and with a divided exhaust gas flow having at least two exhaust valves and one intake valve per cylinder. A first exhaust valve is connected to a first exhaust manifold which leads to the turbine of the compressor, while a second exhaust valve is connected to a second exhaust manifold which opens downstream of the turbine. The charging pressure in the engine can be regulated by virtue of the opening periods of the at least two exhaust valves being varied in relation to one another in order to adapt the flow through the exhaust turbine to a value which provides the desired charging pressure in the engine. By opening the second exhaust valve increasingly earlier, an increasingly lower charging pressure can be achieved.

SUMMARY OF THE INVENTION

It would be advantageous to achieve an adaptation of operation of a compressor of a turbocharger, e.g. to different operating conditions of an ICE. In particular, it would be desirable to enable flexible adaptation of operation of the compressor utilizing a turbocharger without a wastegate. To better address one or more of these concerns, according to one aspect, a four-stroke internal combustion engine having the features defined in one of the independent claims is provided, and according to a further aspect, a method of controlling timings of an exhaust camshaft and an intake camshaft of a four-stroke internal combustion engine defined in one of the independent claims is provided.

According to an aspect, there is provided a four-stroke internal combustion engine comprising at least one cylinder arrangement, a crankshaft, an exhaust camshaft, an intake camshaft, a turbocharger, and a control system. The cylinder arrangement comprises a combustion chamber, a cylinder bore, a piston configured to reciprocate in the cylinder bore and being connected to the crankshaft, an exhaust valve, and an intake valve. The exhaust camshaft is configured to control the opening and closing of the exhaust valve, and the intake camshaft is configured to control the opening and closing of the intake valve. The turbocharger comprises a compressor and a turbine, the turbine being arranged in an exhaust gas flow path extending from the exhaust valve. A timing of the exhaust camshaft and a timing of the intake camshaft are controllable by the control system. The control system is configured to:

store a compressor map related to the compressor of the turbocharger, store a reference area within the compressor map, determine at least two parameters out of: a current turbocharger rotational speed, a current charge air mass flow, and one of a current charge air pressure or a current compressor pressure ratio, and in response to the at least two parameters indicating that a current operational point of the compressor is outside the reference area at a higher charge air mass flow than a maximum charge air mass flow of the reference area at a compressor pressure ratio of the current operational point, change the timing of the exhaust camshaft to advance closing of the exhaust valve, and change the timing of the intake camshaft to delay opening of the intake valve.

Since the control system, in response to the at least two parameters indicating that a current operational point of the compressor is outside the reference area at a higher charge air mass flow than a maximum charge air mass flow of the reference area at a compressor pressure ratio of the current operational point, is configured to:—change the timing of the exhaust camshaft to advance closing of the exhaust valve, and—change the timing of the intake camshaft to delay opening of the intake valve, no wastegate is required for reducing the charge air pressure provided by the compressor of the turbocharger. Thus, flexible adaptation of operation of the compressor utilizing a turbocharger without a wastegate is achieved.

According to a further aspect, there is provided a method of controlling timings of an exhaust camshaft and an intake camshaft of a four-stroke internal combustion engine comprising at least one cylinder arrangement, a crankshaft, the exhaust camshaft, the intake camshaft, a turbocharger, and a control system. The cylinder arrangement comprises a combustion chamber, a cylinder bore, a piston configured to reciprocate in the cylinder bore and being connected to the crankshaft, an exhaust valve, and an intake valve. The exhaust camshaft is configured to control the opening and closing of the exhaust valve, and the intake camshaft is configured to control the opening and closing of the intake valve. The turbocharger comprises a compressor and a turbine, the turbine being arranged in an exhaust gas flow path extending from the exhaust valve. The control system is configured to store a compressor map related to the compressor of the turbocharger, and to store a reference area within the compressor map. The method comprises steps of:
  determining at least two parameters out of: a current turbocharger rotational speed, a current charge air mass flow, and one of a current charge air pressure or a current compressor pressure ratio,
  detecting whether the at least two parameters indicate that a current operational point of the compressor is outside the reference area at a higher charge air mass flow than a maximum charge air mass flow of the reference area at a compressor pressure ratio of the current operational point, and
  in response thereto perform steps of:
  changing the timing of the exhaust camshaft to advance closing of the exhaust valve, and
  changing the timing of the intake camshaft to delay opening of the intake valve.

Since the method comprises steps of:—changing the timing of the exhaust camshaft to advance closing of the exhaust valve, and—changing the timing of the intake camshaft to delay opening of the intake valve, in response to a step of:—detecting whether the at least two parameters indicate that a current operational point of the compressor is outside the reference area at a higher charge air mass flow than a maximum charge air mass flow of the reference area at a compressor pressure ratio of the current operational point, no wastegate is required for reducing the charge air pressure provided by the compressor of the turbocharger. Thus, flexible adaptation of operation of the compressor utilizing a turbocharger without a wastegate is achieved.

The inventors have realized that changing the timing of camshafts in order to advance closing of the exhaust valve and delay opening of the intake valve may be utilized for controlling the operation of the turbocharger. Such change of timing of the camshafts reduces exhaust gas flow from the combustion chamber to the turbine of the turbocharger. Thus, the control of the operation of the turbocharger may be utilized e.g. for preventing choking of the compressor of the turbocharger, and/or for moving a current operational point of the compressor towards an operational point where the compressor operates more efficiently.

The four-stroke internal combustion engine, ICE may be a compression ignition ICE, such as a diesel engine, alternatively, the ICE may be an Otto engine. Herein, the four-stroke ICE alternatively may be simply referred to as an internal combustion engine, ICE.

As in any four-stroke ICE, the piston performs an intake stroke, a compression stroke, a power stroke, and an exhaust stroke in the cylinder bore of the cylinder arrangement. The ICE may comprise more than one cylinder arrangement, such as e.g. four, five, six, or eight cylinder arrangements.

The exhaust camshaft is configured to control the opening and closing of the exhaust valve in a commonly known manner with a cam lobe of the exhaust camshaft controlling the exhaust valve. The intake camshaft is configured to control the opening and closing of the intake valve in a commonly known manner with a cam lobe of the intake camshaft controlling the intake valve.

The compressor and the turbine of the turbocharger are connected via a common shaft. The exhaust gas flow path may extend from the exhaust valve via the turbine to an aftertreatment system for exhaust gas. In case the cylinder arrangement comprises one or more further exhaust valves, the exhaust gas flow path extends also from the one or more further exhaust valves via the turbine to the exhaust gas aftertreatment system. An intake air flow path extends via the compressor to the intake valve.

The rotation of the exhaust and intake camshafts are synchronized with the crankshaft. However, the timing of the exhaust and intake camshafts being controllable entails that the rotational position of the camshafts in relation to the crankshaft is changeable. This may also be referred to as cam phasing. In practice, this means that the crankshaft angle at which a valve controlled by the relevant camshaft is opened and closed can be changed. The changing of the timing of the camshafts may be performed in any known manner. For instance, WO 2017/217908 and U.S. Pat. No. 8,714,123 disclose suitable timing control arrangements to be utilized for changing the timing of the camshafts. As mentioned above, the timings of the exhaust and intake camshafts are controllable by the control system, i.e. the control system is configured to change the rotational position of the camshafts in relation to the crankshaft.

It is to be noted that the length of the open period of each of the exhaust and intake valves remains the same when the timing of the valves is changed. This, as opposed to prior art systems where lost motion mechanisms are utilized for changing closing and/or opening positions of valves, which accordingly will also affect the length of the period during which the relevant valve remains open.

The amount of timing change of the camshafts may be one fixed amount of timing change for each camshaft. Alternatively, each camshaft may have a variable amount of timing change providing at least two different amounts of timing change to provide different amount of exhaust gas flowing through the exhaust path.

Herein, reference will be made to crankshaft angle degrees, CA degrees, when discussing timing changes of the camshafts. One full rotation of the crankshaft is 360 CA degrees. Crankshaft angle may be measured e.g. from Top Dead Centre fire, TDCfire, or Top Dead Centre gas exchange, TDCge.

Concerning the relation between closing of the exhaust valve and opening of the intake valve at TDCge, reference is made to an (ordinary) overlap, i.e. an angle of rotation of the crankshaft during which both the exhaust and intake valves are open. The opposite may be referred to as a negative overlap, i.e. an angle of rotation at TDCge during which both the exhaust valve and the intake valve are closed.

If the cylinder arrangement comprises one or more additional intake valves and/or exhaust valves, also these valves have to open and close in the manner discussed above, which will occur if such additional valves are controlled by the first and/or second camshafts. Accordingly, if the additional valves are controlled by additional camshafts, also the timing of any additional camshafts will be changed in accordance with the discussion above.

A compressor map is a commonly known map showing the operational range of a particular type of compressor, i.e. in this case the compressor of the relevant turbocharger of the ICE. For instance, the compressor map may be defined as a field in a coordinate system having axes expressing charge air mass flow and compressor pressure ratio, i.e. the relationship between the charge air pressure after and before the compressor, $p_{out}:p_{in}$.

The term reference area relates to an area of the compressor map. The reference area may cover the entire compressor map, or it may cover only part of the compressor map. The reference area may even be formed by one point within the compressor map. The reference area may represent an optimal operational range, or an optimal operational point, of the compressor within the compressor map, such as e.g.:
- an area with better ICE fuel economy than a current operational point of the compressor,
- an area with less risk of choking or surging the compressor than a current operational point of the compressor
- an area with lower exhaust gas temperature under current ICE operating conditions than in a current operational point of the compressor, and/or
- an area along a target rotational speed of the turbocharger.

According to embodiments, the control system may be configured to, in response to the at least two parameters indicating that a current operational point of the compressor being outside the reference area at a lower charge air mass flow than a minimum charge air mass flow of the reference area at a compressor pressure ration of the current operational point:
- change the timing of the exhaust camshaft to delay closing of the exhaust valve, and
- change the timing of the intake camshaft to advance opening of the intake valve.

In this manner, the timing of the camshafts may increase the gas flow from the combustion chamber to the turbine of the turbocharger. That is, an overlap between the open exhaust and intake valves is increased or created, permitting gas flow from the intake valve to the exhaust valve. Thus, the control of the operation of the turbocharger may be provided e.g. for preventing surge of the compressor of the turbocharger, and/or for moving a current operational point of the compressor towards an operational point where the compressor operates more efficiently.

According to embodiments, the exhaust gas flow path may in its entirety extend through the turbine. In this manner, all exhaust gas from the cylinder arrangement passes through the turbine. Thus, the turbine forms an only flow path portion leading from the cylinder arrangement to exhaust gas aftertreatment equipment downstream of the turbine, i.e. there is no parallel flow path to the turbine that leads to the exhaust gas aftertreatment equipment. Put differently, no further flow path for exhaust gas from the cylinder arrangement extends in parallel with the exhaust gas flow path.

According to embodiments, the control system may be configured to:
- determine a current turbocharger rotational speed and/or a cylinder pressure of the cylinder arrangement, and in response to the current turbocharger rotational speed exceeding a maximum rotational speed threshold and/or the cylinder pressure exceeding a maximum cylinder pressure,
  - change the timing of the exhaust camshaft to advance closing of the exhaust valve, and
  - change the timing of the intake camshaft to delay opening of the intake valve.

In this manner, turbocharger rotational speed and/or cylinder pressure of the cylinder arrangement may be reduced in order to protect the turbocharger and/or the ICE. A negative overlap between the open exhaust and intake valves thus, may be provided, which in turn reduces flow of exhaust gas to the turbine. Also, this reduces the charge air pressure and the load on the ICE.

According to embodiments, the control system may be configured to:
- store a target lambda value or a lambda value range,
- determine a current lambda value, and
- in response to the current lambda value being above the target lambda value or lambda value range,
  - change the timing of the exhaust camshaft to advance closing of the exhaust valve, and
  - change the timing of the intake camshaft to delay opening of the intake valve.

In this manner, the lambda value of the ICE may be adjusted towards the target lambda value. Namely, by reducing an overlap between the open exhaust and intake valves, or by creating a negative overlap, the lambda value of the ICE may be reduced.

According to embodiments, the control system, in response to the current lambda value being below the target lambda value or lambda value range, may be configured to:
- change the timing of the exhaust camshaft to delay closing of the exhaust valve, and
- change the timing of the intake camshaft to advance opening of the intake valve.

In this manner, the lambda value of the ICE may be adjusted towards the target lambda value. Namely, by increasing an overlap between the open exhaust and intake valves, or by reducing a negative overlap, the lambda value of the ICE may be increased.

According to embodiments, the change of the timing of the exhaust camshaft to advance closing of the exhaust valve in advancing CA degrees may be of an equal magnitude as, or may differ within a range of maximum +/−10 CA degrees from, the change of the timing of the intake camshaft to delay opening of the intake valve in delay CA degrees. In this manner, a substantially symmetrical camshaft phasing about TDCge may be achieved. Symmetrical camshaft phasing about TDCge may improve fuel consumption of the ICE when advancing closing of the exhaust valve and delaying opening of the intake valve in comparison with providing only early closing of the exhaust valve or only late opening of the intake valve.

According to a further aspect, there is provided a vehicle comprising a four-stroke internal combustion engine according to any one of aspects and/or embodiments discussed herein.

The vehicle may be a heavy load vehicle such as e.g. a truck, a bus, a construction vehicle, a pickup, a van, or other similar motorized manned or unmanned vehicle, designed for land-based propulsion, on or off road.

According to a further aspect, there is provided a computer program comprising instructions which, when the program is executed by a computer, causes the computer to carry out a method according to any one of aspects and/or embodiments discussed herein.

According to a further aspect, there is provided a computer-readable storage medium comprising instructions which, when executed by a computer, cause the computer to carry out a method according to any one of aspects and/or embodiments discussed herein.

Further features of, and advantages with, the invention will become apparent when studying the appended claims and the following detailed description.

BRIEF DESCRIPTION OF THE DRAWINGS

Various aspects and/or embodiments of the invention, including its particular features and advantages, will be readily understood from the example embodiments discussed in the following detailed description and the accompanying drawings, in which.

DETAILED DESCRIPTION

Aspects and/or embodiments of the invention will now be described more fully. Like numbers refer to like elements throughout. Well-known functions or constructions will not necessarily be described in detail for brevity and/or clarity.

Figure 1:
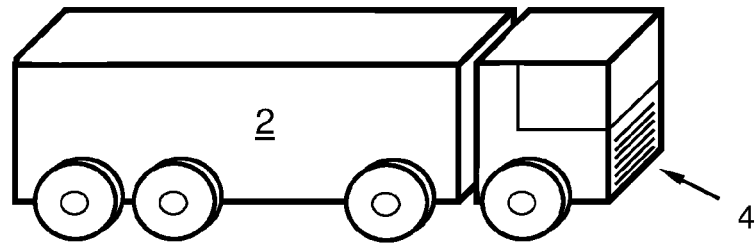
FIG. 1 illustrates embodiments of a vehicle configured for land-based propulsion, FIG. 2 schematically illustrates embodiments of an ICE.

FIG. 1 illustrates embodiments of a vehicle 2 configured for land-based propulsion. The vehicle 2 comprises a four-stroke internal combustion engine, ICE, 4 according to aspects and/or embodiments discussed herein, such as e.g. the ICE discussed below with reference to FIG. 2.

In these embodiments, the vehicle 2 is a heavy load vehicle in the form of a truck. However, the invention is not limited to the particular type of vehicle.

Figure 2:
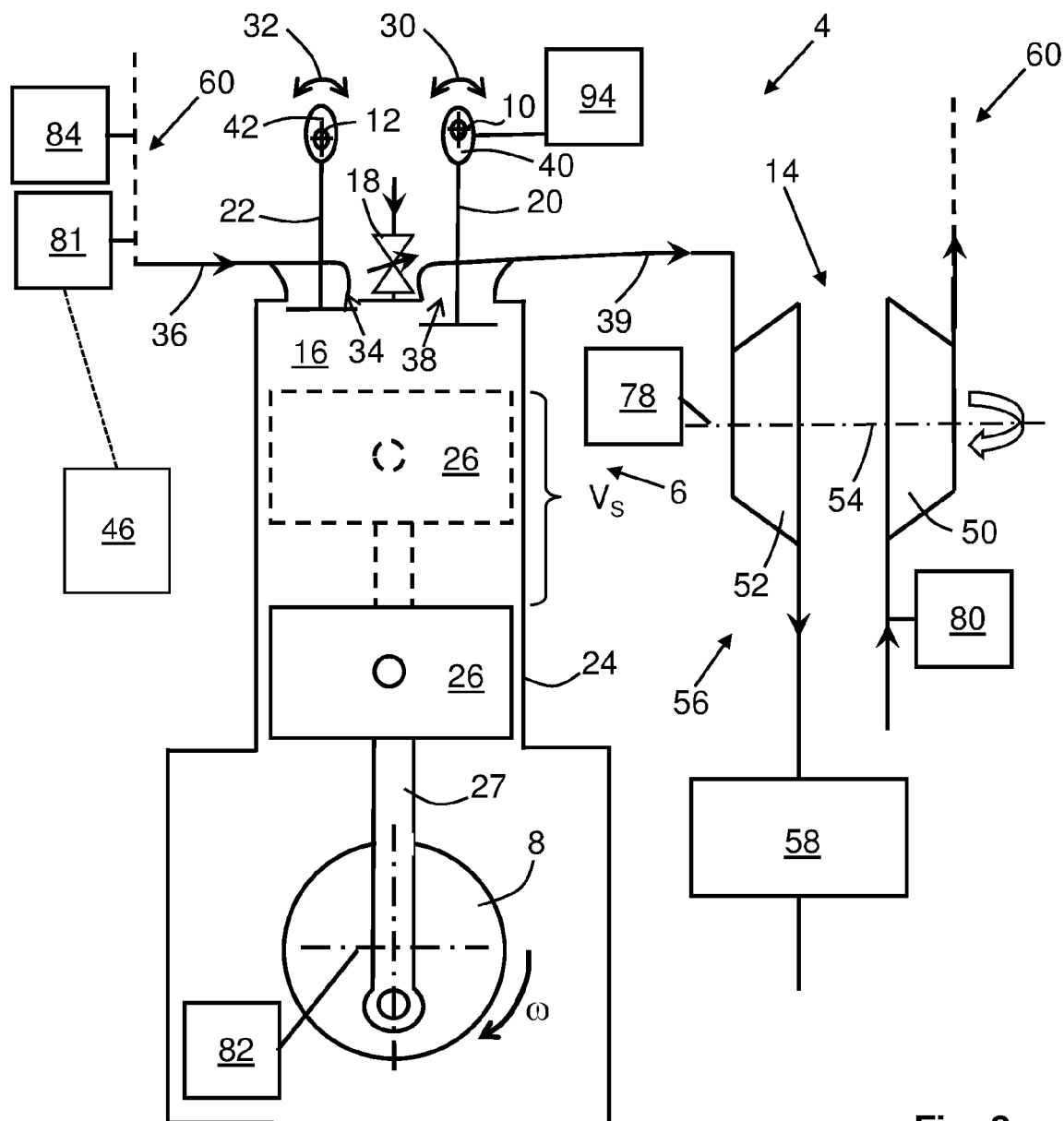

FIG. 2 schematically illustrates embodiments of an ICE 4. The ICE 4 may be configured to form part of a powertrain of a vehicle, such as e.g. the vehicle 2 shown in FIG. 1.

The ICE 4 is a four-stroke direct injection internal combustion engine, such as a compression ignition ICE 4, e.g. a diesel engine. The ICE 4 comprises at least one cylinder arrangement 6, a crankshaft 8, an exhaust camshaft 10, an intake camshaft 12, and a turbocharger 14.

The cylinder arrangement 6 comprises a combustion chamber 16, a fuel injector 18, an exhaust valve 20, an intake valve 22, a cylinder bore 24, and a piston 26 configured to reciprocate in the cylinder bore 24. The piston 26 is connected to the crankshaft 8 via a connecting rod 27. The movement of the exhaust valve 20 is controlled by the exhaust camshaft 10, i.e. the exhaust camshaft 10 is configured to control the opening and closing of the exhaust valve 20. The movement of the intake valve 22 is controlled by the intake camshaft 12, i.e. the intake camshaft 12 is configured to control the opening and closing of the intake valve 22.

The intake valve 22 is configured for admitting charge air into the combustion chamber 16, and the exhaust valve 20 is configured for letting exhaust gas out of the combustion chamber 16. The timing of the exhaust camshaft 10 is configured to the be controlled by a timing control arrangement 30 as indicated by a double arrow. Similarly, the timing of the intake camshaft 12 is configured to the be controlled by a timing control arrangement 32 as indicated by a double arrow.

In a known manner, the piston 26 is arranged to reciprocate in the cylinder bore 24. The piston 26 performs four strokes in the cylinder bore 24, corresponding to an intake stroke, a compression stroke, a power stroke, and an exhaust stroke, see also FIG. 5. In FIG. 2 the piston 26 is illustrated with continuous lines at its Bottom Dead Centre, BDC, and with dashed lines at its Top Dead Centre, TDC. The combustion chamber 16 is formed above the piston 26 inside the cylinder bore 24.

In a known manner, the intake valve 22 comprises an intake valve head configured to seal against an intake valve seat extending around an intake opening 34. An inlet conduit 36 for charge air, leads from the turbocharger 14 to the intake opening 34. The exhaust valve 20 comprises an exhaust valve head configured to seal against an exhaust valve seat extending around an exhaust opening 38. An exhaust conduit 39 leads from the exhaust opening 38 to the turbocharger 14.

In a known manner, the camshafts 10, 12 rotate at half the rotational speed of the crankshaft 8 and control the movement of the exhaust and intake valves 20, 22 via cam lobes 40, 42 arranged on the camshafts 10, 12. The exhaust camshaft 10 is arranged for controlling movement of the exhaust valve 20, and opening and closing of the exhaust opening 38. The exhaust camshaft 10 comprises a cam lobe 40. For instance, by abutting against the cam lone 40, the exhaust valve 20 will follow a contour of the cam lobe 40. The exhaust valve 20 may be biased towards its closed position, e.g. by means of a non-shown spring. The movement of the intake valve 22 is controlled in a corresponding manner by the intake camshaft 12 and its cam lobe 42 for opening and closing the intake opening 34.

The cylinder arrangement 6 has a total swept volume, $V_s$, in the cylinder bore 24 between the BDC and the TDC. According to some embodiments, the cylinder arrangement 6 may have a total swept volume, $V_s$, of within a range of 0.3 to 4 litres. Mentioned purely as an example, in the lower range of Vs, the cylinder arrangement 6 may form part of an internal combustion engine for a passenger car, and in the middle and higher range of Vs, the cylinder arrangement 4 may form part of an internal combustion engine for a heavy load vehicle such as e.g. a truck, a bus, or a construction vehicle.

The ICE 4 comprises a control system 46. The control system 46 is configured to control at least the timing of the exhaust camshaft 10 and of the timing of the intake camshaft 12. Thus, the timing control arrangements 30, 32 are controllable by the control system 46.

The turbocharger 14 comprises a compressor 50 and a turbine 52. The compressor 50 and the turbine 52 of the turbocharger 14 are connected via a common shaft 54.

The turbine 52 is arranged in an exhaust gas flow path 56 extending from the exhaust valve 20 and the exhaust opening 38. The exhaust gas flow path 56 may extend to an aftertreatment system 58 configured for aftertreatment of exhaust gas. The exhaust conduit 39 leading from the exhaust opening 38 to the turbine 52 of the turbocharger 14 forms part of the exhaust gas flow path 56.

As shown in these embodiments, the exhaust gas flow 56 path extends in its entirety through the turbine 52. Thus, all exhaust gas from the cylinder arrangement 6 passes through the turbine 52.

An intake air flow path 60 extends via the compressor 50 to the intake valve 22 and the intake opening 34. In FIG. 2 the intake air flow path 60 is indicated with broken lines. For the sake of clarity, the intake air flow path 60 is not shown in its entirety. The inlet conduit 36 leading from the compressor 50 of the turbocharger 14 to the intake opening 34 forms part of the charge air flow path 60.

Figure 3:
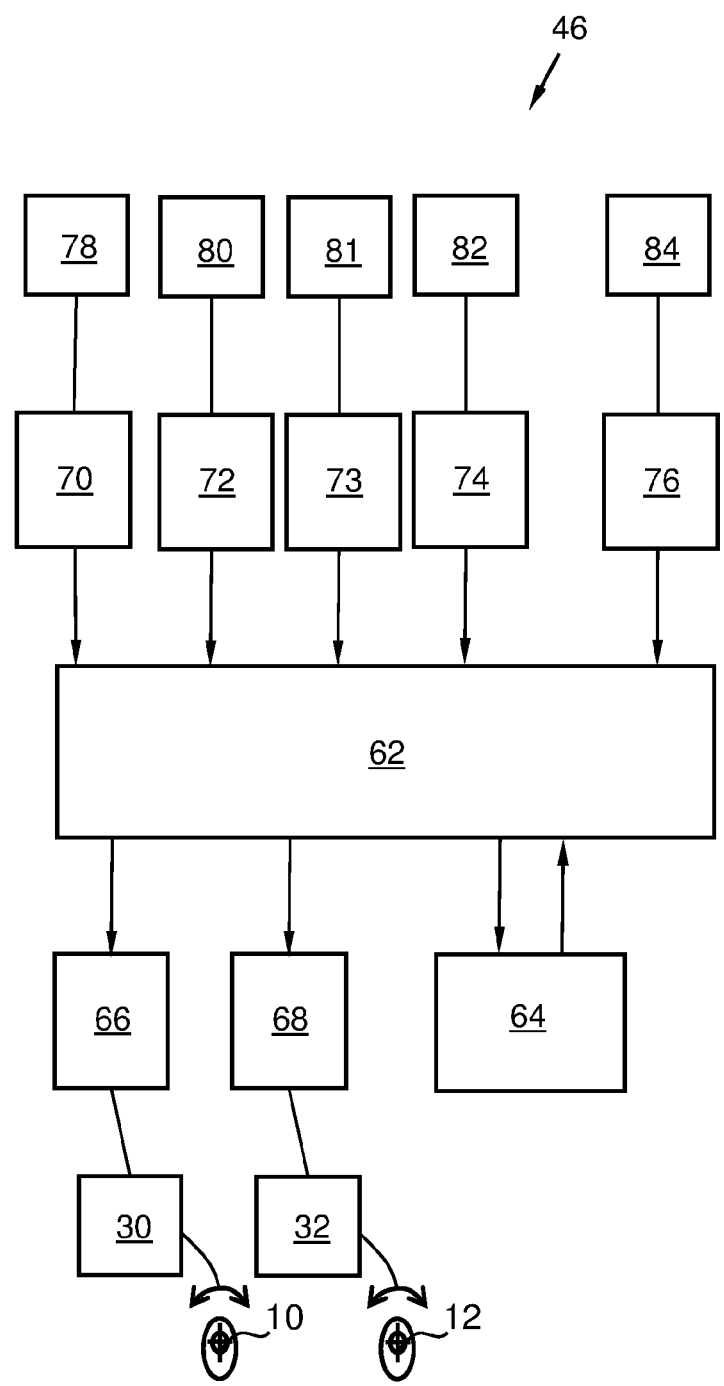
FIG. 3 illustrates a control system.

FIG. 3 illustrates a control system 46 to be utilized in connection with the different aspects and/or embodiments of the invention. In particular, the control system 46 is configured for the control of the timing of the camshafts 10, 12 of the ICE 4 discussed in connection with FIGS. 1, 2, 4, and 5. The control system 46 is also indicated in FIG. 2.

The control system 46 comprises at least one calculation unit 62, which may take the form of substantially any suitable type of processor circuit or microcomputer, e.g. a circuit for digital signal processing (digital signal processor, DSP), a Central Processing Unit (CPU), a processing unit, a processing circuit, a processor, an Application Specific Integrated Circuit (ASIC), a microprocessor, or other processing logic that may interpret and execute instructions. The herein utilized expression "calculation unit" may represent a processing circuitry comprising a plurality of processing circuits, such as, e.g., any, some or all of the ones mentioned above.

The control system 46 comprises a memory unit 64. The calculation unit 62 is connected to the memory unit 64, which provides the calculation unit 62 with, e.g. stored programme code, data tables, and/or other stored data which the calculation unit 62 needs to enable it to do calculations and to control the ICE. The calculation unit 62 is also adapted to store partial or final results of calculations in the memory unit 64. The memory unit 64 may comprise a physical device utilized to store data or programs, i.e. sequences of instructions on a temporary or permanent basis. According to some embodiments, the memory unit 64 may comprise integrated circuits comprising silicon-based transistors. The memory unit 64 may comprise e.g. a memory card, a flash memory, a USB memory, a hard disc, or another similar volatile or non-volatile storage unit for storing data such as e.g. ROM (Read-Only Memory), PROM (Programmable Read-Only Memory), EPROM (Erasable PROM), EEPROM (Electrically Erasable PROM), etc. in different embodiments.

The control system 46 is further provided with respective devices 70, 72, 73, 74, 76, 66, 68 for receiving and/or sending input and output signals. These input and output signals may comprise waveforms, pulses or other attributes, which can be detect as information by signal receiving devices, and which can be converted to signals processable by the calculation unit 62. Input signals are supplied to the calculation unit 62 from the input receiving devices 70, 72, 73, 74, 76. Output signal sending devices 66, 68 are arranged to convert calculation results from the calculation unit 62 to output signals for conveying to signal receiving devices of other parts of the control system 46. Each of the connections to the respective devices for receiving and sending input and output signals may take the form of one or more from among a cable, a data bus, e.g. a CAN (controller area network) bus, a MOST (media orientated systems transport) bus or some other bus configuration, or a wireless connection. In the embodiment depicted, only one calculation unit 62 and memory 64 are shown, but the control system 46 may alternatively comprise more than one calculation unit and/or memory.

Mentioned as examples, the output signal sending devices 66, 68 may send control signals to the timing control arrangements 30, 32 of the exhaust and intake camshafts 10, 12. The input signal receiving devices 70, 72, 73, 74, 76 may receive signals from the ICE 4, such as e.g. from a turbocharger rotational speed sensor 78, a charge air mass flow sensor 80, a charge air pressure sensor 81, an engine rotational speed sensor 82, and a charge air temperature sensor 84.

Examples of a data tables may be e.g.; a table containing relationships between air pressure, density and temperature, a table showing relationships between turbocharger rotational speed and compressor pressure ratio, and a table containing fuel injection quantities. Suitably, there is provided at least one data table containing initial timing settings of the intake and exhaust camshafts in relation to engine load, engine rotational speed, and ambient air pressure and/or density, i.e. one or more tables providing the timing settings of the intake and exhaust camshafts during various ICE operating conditions. A further example of a data table is a compressor map related to the compressor of the turbocharger. In connection with the compressor map one or more data tables representing one or more reference areas within the compressor map may be stored in the memory 64. Examples of data may be measured, monitored, and/or calculated data. The control system 46 is connected to various sensors and actuators in order to receive input and provide output for performing the various aspects and embodiments of the method discussed herein. Some of the various sensors are exemplified above. An example of actuators may be actuators configured for changing the timing of the camshafts 10, 12 and forming part of the timing control arrangements 30, 32.

According to some embodiments, the control system 46 may comprise further sensors, such as e.g. one or more of an ambient air pressure sensor, an ambient air temperature sensor, and a differential pressure sensor measuring the pressure difference between the intake and outlet of the turbine 50. In the latter case, the charge air pressure sensor 81 may form part of such a differential pressure sensor.

The control system 46 is configured to perform a method 100 according to any one of aspects and/or embodiments discussed herein, see e.g. below with reference to FIG. 6.

In the following reference is made to FIGS. 2-4d.

Figure 4A:
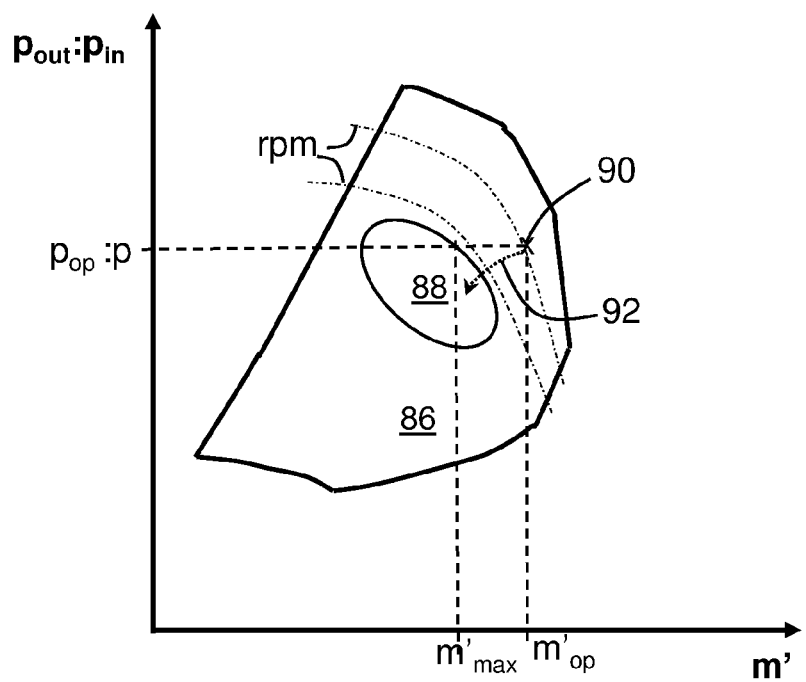
FIGS. 4a-4d show compressor maps.

The control system 46 is configured to:

Store a compressor map related to the compressor 50 of the turbocharge 14. FIG. 4a illustrates an example of a compressor map 86. The compressor map 86 defines the operational area of the compressor 50 as a field in a coordinate system having axes expressing charge air mass flow, m', and compressor pressure ratio, $p_{out}{:}p_{in}$. A rotational speed of the turbocharger 14 is represented by a curved line in the compressor map 86. In FIG. 4a two different rotational speeds have been indicated with dash-dotted lines marked "rpm".

Store a reference area 88 within the compressor map 86. The reference area 88 relates to an area or a point within the compressor map 86.

Determine at least two parameters out of: a current turbocharger rotational speed, a current charge air mass flow, and one of a current charge air pressure or a current compressor pressure ratio.

Utilizing the at least two parameters, either directly or indirectly, a current operational point 90 of the compressor 50 may be determined. For instance, from the current turbocharger rotational speed and the current compressor pressure ratio, the current operational point 90 may be determined in the compressor map 86. Alternatively, the current turbocharger rotational speed or the current compressor pressure ratio together with the current charge air mass flow, e.g. measured by a charge air mass flow sensor 80, may provide the operational point 90 in the compressor map 86. Alternatively, the charge air mass flow may be calculated flow from current engine operational data such as engine rotational speed, total swept volume, $V_s$, charge air temperature, charge air pressure and volumetric efficiency, (the latter may be corrected for current timing settings of the exhaust and/or intake camshafts). The current charge air pressure and the current compressor pressure ratio are alternative parameters to be determined. The current charge air pressure may provide an approximation of the current compressor pressure ratio with knowledge about ambient air pressure and the pressure drop in an air intake system leading up to the intake of the turbine 50. The approximation of the compressor pressure ratio, or the compressor pressure ratio determined otherwise, may be combined with one of the current turbocharger rotational speed or the current charge air mass flow to determine the operational point 90 in the compressor map 86.

Thus, the control system 46 may be configured to determine, based on the at least two parameters, whether a current operational point 90 of the compressor 50 is outside the reference area 88 at a higher charge air mass flow $m'_{op}$ than a maximum charge air mass flow of the reference area 88 at a compressor pressure ratio of the current operational point 90.

The control system 46 is further configured to, in response to the at least two parameters indicating that the current operational point 90 of the compressor 50 is outside the reference area 88 at the higher charge air mass flow than the maximum charge air mass flow of the reference area 88 at the compressor pressure ratio of the current operational point 90:

Change the timing of the exhaust camshaft 10 to advance closing of the exhaust valve 20.

Change the timing of the intake camshaft 12 to delay opening of the intake valve 22. Thus, an overlap between the open exhaust and intake valves 22, 20 is reduced or a negative overlap is created or increased.

More specifically, with reference to FIG. 4a, the current operational point 90 of the compressor 50 lies at a higher charge air mass flow, $m'_{op}$, than the maximum charge air mass flow, $m'_{max}$, of the reference area 88 at the compressor pressure ratio, $p_{op}$:p, of the current operational point 90. By changing the timing of the camshafts 10, 12 as mentioned above, the operational point of the compressor 50 is moved towards, and/or into the reference area 88, as indicated by the arrow 92. For instance, the reference area 88 may represent an optimal operational range of the compressor 50. Thus, by changing the timing of the camshafts 10, 12 the compressor 50 will operate in a more optimal portion of the compressor map 86 than the previous current operational point 90. Thus, flexible adaptation of operation of the compressor 50 is achieved.

According to embodiments, the control system 46 may comprise a charge air pressure sensor 81, and one of the at least two parameters may be the current charge air pressure or the current compressor pressure ratio. In this manner, the current charge air pressure or the current compressor pressure ratio may be determined utilizing the charge air pressure sensor 81. The current compressor pressure ratio may be used directly for determining the current operational point 90 of the compressor 50. The current charge air pressure may be utilized for calculating and/or for determining an approximation of the current compressor pressure ratio, as discussed above, which then in turn may be used for determining the current operational point 90 of the compressor 50. In the latter case the control system 46 may utilize information about ambient air pressure in order to calculate the compressor pressure ratio.

According to embodiments, the control system 46 may comprise at least two of a turbocharger rotational speed sensor 78, a charge air mass flow sensor 80, an engine rotational speed sensor 82, and a charge air temperature sensor 84. In this manner, one or more of these sensors 78, 80, 82, 84 may be utilized for determining the current charge air mass flow of the operational point 90 of the compressor 50 as discussed above with respect to the current turbocharger rotational speed, the current charge air mass flow, the current charge air pressure, and the current compressor pressure ratio.

As an alternative to a rotational speed sensor 78 of the turbocharger 14, a turbine map may be utilized for determining the rotational speed of the turbocharger 14. The turbine map may show the turbine pressure ratio and mass flow through the turbine. By determining a pressure difference between an inlet side and an outlet side of the turbine 52 of the turbocharger 14, and a mass flow through the turbine, a point within the turbine map and thus, the rotational speed of the turbocharger 14 may be determined.

Figure 4B:
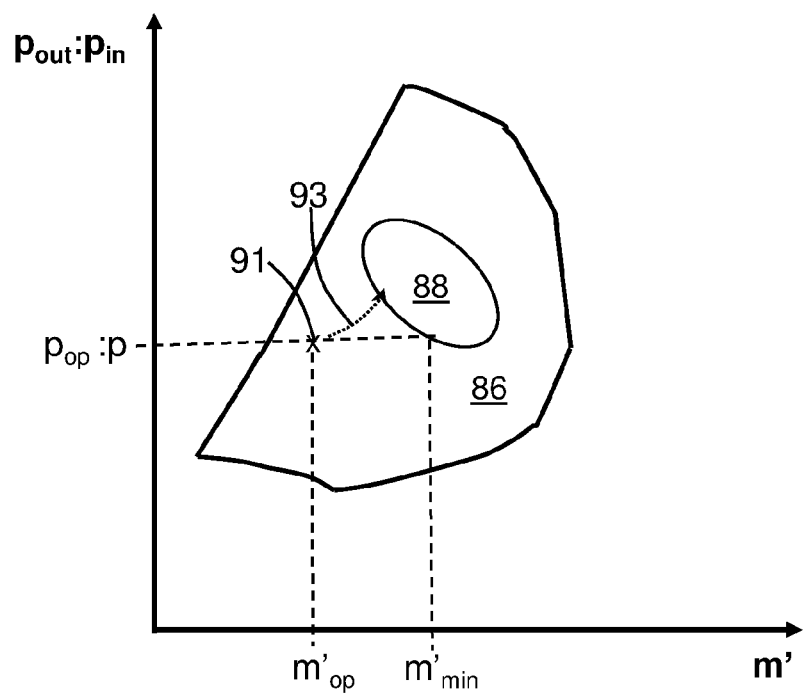

According to embodiments, the control system 46 may be configured to:

With reference to FIG. 4b, determine based on the at least two parameters, whether a current operational point 91 of the compressor 50 is outside the reference area 88 at a lower charge air mass flow $m'_{op}$ than a minimum charge air mass flow of the reference area 88 at a compressor pressure ratio of the current operational point 91.

The control system 46 is further configured to, in response to the at least two parameters indicating that the current operational point 91 of the compressor 50 is outside the reference area 88 at the lower charge air mass flow than the minimum charge air mass flow of the reference area 88 at the compressor pressure ratio of the current operational point 91:

Change the timing of the exhaust camshaft 10 to delay closing of the exhaust valve 20.

Change the timing of the intake camshaft 12 to advance opening of the intake valve 22. Thus, an overlap between the open exhaust and intake valves 22, 20 is increased.

More specifically, with reference to FIG. 4b, the current operational point 91 of the compressor 50 lies at a lower charge air mass flow, $m'_{op}$, than the minimum charge air mass flow, $m'_{min}$, of the reference area 88 at the compressor pressure ratio, $p_{op}$:p, of the current operational point 91. By changing the timing of the camshafts 10, 12 as mentioned above, the operational point of the compressor 50 is moved towards, and/or into the reference area 88, as indicated by the arrow 93. For instance, the reference area 88 may represent an optimal operational range of the compressor 50. Thus, by changing the timing of the camshafts 10, 12 the compressor 50 will operate in a more optimal portion of the compressor map 86 than the previous current operational point 91. Thus, flexible adaptation of operation of the compressor 50 is achieved.

According to embodiments, the control system 46 may be further configured to:
- Determine a current turbocharger rotational speed and/or a cylinder pressure of the cylinder arrangement 6.
- In response to the current turbocharger rotational speed exceeding a maximum rotational speed threshold and/or the cylinder pressure exceeding a maximum cylinder pressure, the control system 46 may be configured:
  - Change the timing of the exhaust camshaft 10 to advance closing of the exhaust valve 20.
  - Change the timing of the intake camshaft 12 to delay opening of the intake valve 22.

The entailing negative overlap due to the change in timing between the open exhaust and intake valves 10, 12 may reduce flow of exhaust gas to the turbine 52 and thus, reduce the rotational speed of the turbocharger 14. Thus, the turbocharger rotational speed and/or cylinder pressure of the cylinder arrangement 6 may be reduced in order to protect the ICE 4 against being overloaded.

In this context a turbocharger rotational speed sensor 78 may be utilized for determining the rotational speed of the turbocharger 14. Alternatively, with knowledge about the current charge air mass flow and the current compressor pressure ratio, the turbocharger rotational speed may be determined from the compressor map 86.

In particular, these embodiments may be utilized in embodiments of the ICE 4 wherein the ICE comprises a decompression brake 94, see FIG. 2. In this manner, turbocharger rotational speed and/or cylinder pressure of the cylinder arrangement 6 may be reduced in order to protect the ICE 4 against being overloaded during compression braking. As such, the compression brake 94, also known as compression release engine brake, is a well-known device for releasing compressed gas from the combustion chamber 16 in order to slow down a vehicle.

According to embodiments, the control system 46 may be configured to:
- Store a target lambda value or lambda value range for the ICE 4.
- Determine a current lambda value of the ICE 4.
- In response to the current lambda value being above the target lambda value or lambda value range the control system 46 may be configured to:
  - Change the timing of the exhaust camshaft 10 to advance closing of the exhaust valve 20.
  - Change the timing of the intake camshaft 12 to delay opening of the intake valve 22. Thus, an overlap between the open exhaust and intake valves 10, 12 is reduced or a negative overlap is created.

According to embodiments, in response to the current lambda value being below the target lambda value or lambda value range, the control system 46 may be configured to:
- Change the timing of the exhaust camshaft 10 to delay closing of the exhaust valve 20.
- Change the timing of the intake camshaft 12 to advance opening of the intake valve 22.

Thus, an overlap between the open exhaust and intake valves 22, 20 is increased.

Figure 4C:
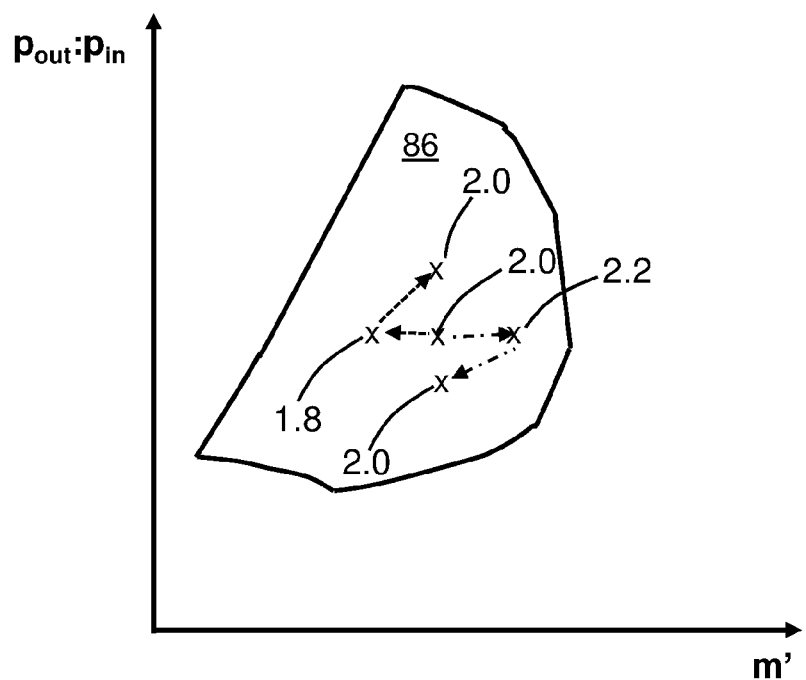

FIG. 4c illustrates with reference to the turbine map 86 how the current lambda value of the ICE 4 may be adjusted utilizing the above discussed changing of the timing of the camshafts 10, 12.

As is known, lambda, λ, of an ICE, i.e. the air-fuel equivalence ratio is the ratio of actual/current air-fuel ratio to stoichiometric air-fuel ratio.

The ICE 4 is operated at a target lambda value, or within a target lambda value range. If ambient air conditions differ from those at which the ICE 4 is set, the current lambda value will differ from the target lambda value, or the target lambda value range. In the example illustrated in FIG. 4c, the target lambda value is 2.0. However, if ambient air pressure is high and/or ambient air temperature is low, the current lambda value may be e.g. 2.2. Accordingly, by reducing an overlap between the open exhaust and intake valves 10, 12, or by creating a negative overlap, the lambda value 2.0 of the ICE 4 may be reached again, by reducing airflow through the cylinder arrangement 6. This sequence of lambda value changes is shown with dash-dotted arrows in FIG. 4c. Conversely, if ambient air pressure is low and/or ambient air temperature is high, the current lambda value may be e.g. 1.8. Accordingly, by increasing an overlap between the open exhaust and intake valves 10, 12 the lambda value 2.0 of the ICE 4 may be reached again, by increasing airflow through the cylinder arrangement 6. This sequence of lambda value changes is shown with a broken line arrows in FIG. 4c.

Figure 6:
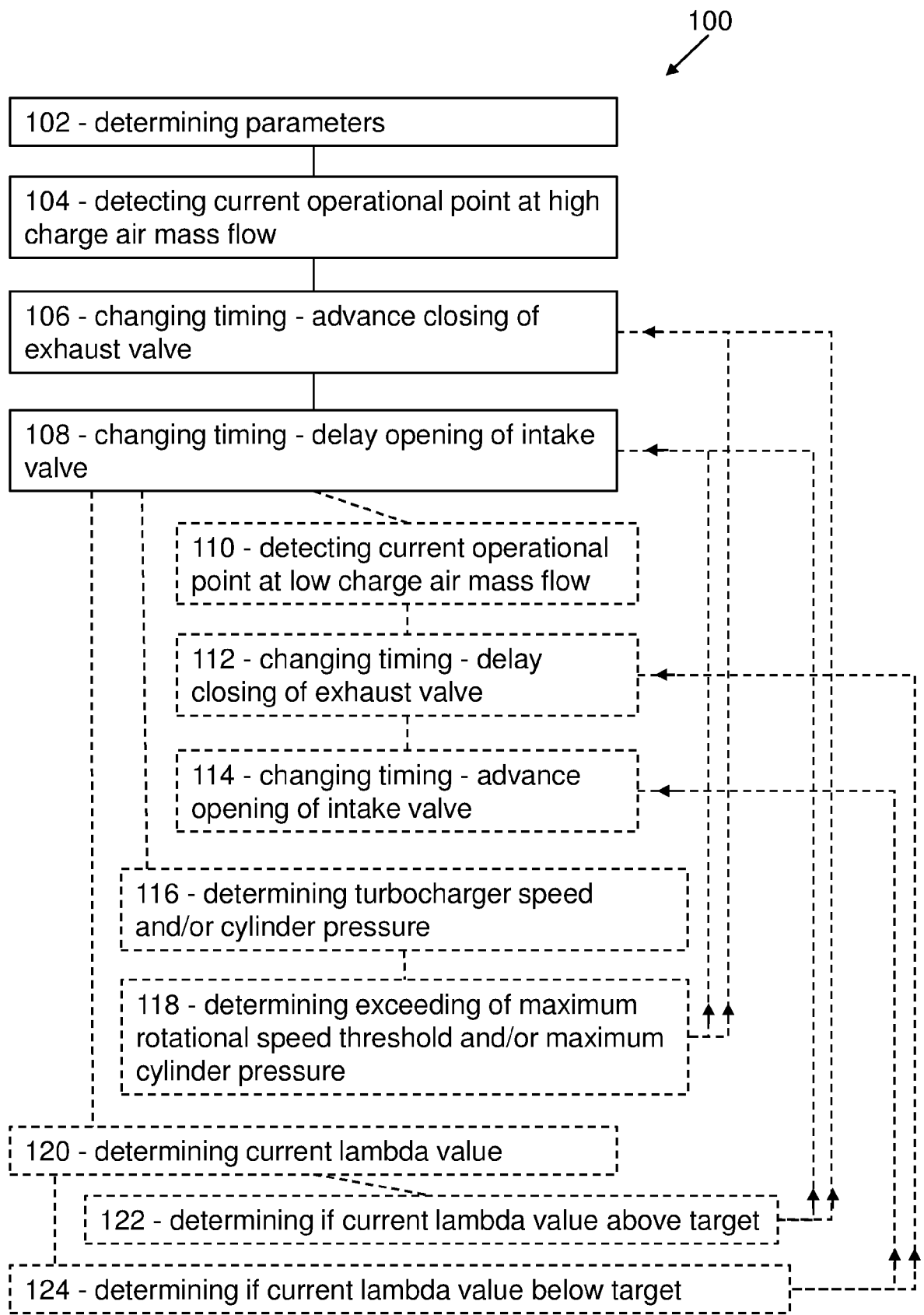
FIG. 6 illustrates embodiments of a method of controlling timings of an exhaust camshaft and an intake camshaft of a four-stroke ICE.

Compressor maps 86 are utilized in FIGS. 4a-4d in order to illustrate different aspects of the control system 46 of the ICE 4 and of the method 100, see FIG. 6. As mentioned above, a compressor map 86 defines the operational area of the compressor 50 of a turbocharger 14. as a field in a coordinate system having axes expressing charge air mass flow, m', and compressor pressure ratio, $p_{out}{:}p_{in}$. Turbocharger rotational speeds are represented by curved lines in the compressor map 86.

FIG. 4a illustrates change of timing of the camshafts 10, 12 to reduce an overlap or create a negative overlap when a current operational point 90 of the compressor 50 lies at a high charge air mass flow, $m'_{op}$. FIG. 4b illustrates change of timing of the camshafts 10, 12 to increase an overlap when a current operational point 91 of the compressor 50 lies at a low charge air mass flow, $m'_{op}$. FIG. 4c illustrates adjustment of a current lambda value of the ICE 4 towards a target lambda value by changing the timing of the camshafts 10, 12.

Figure 4D:
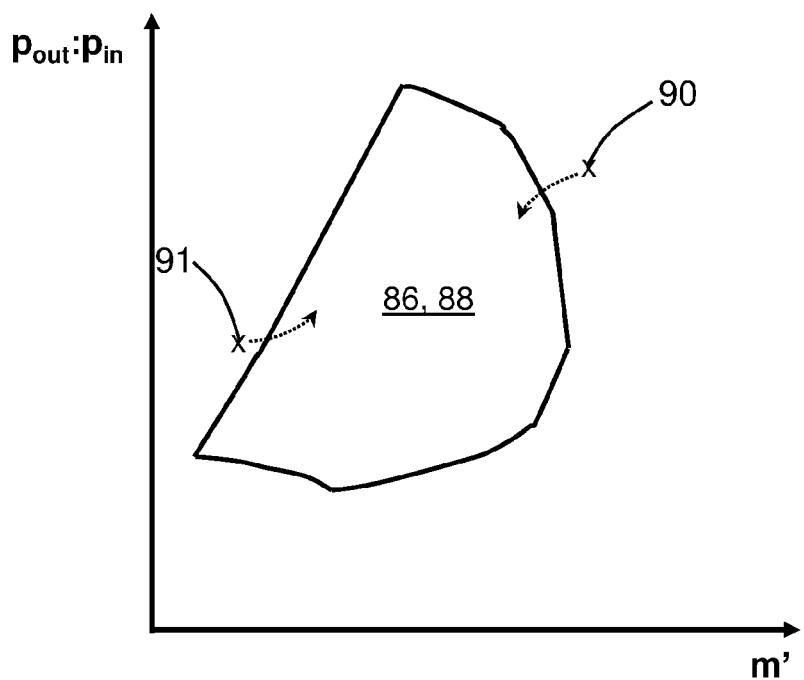

In FIG. 4d two examples similar to those of FIGS. 4a and 4b are illustrated. The two examples relate to the changing of the timing of the camshafts 10, 12 in case of the turbine 50 choking or surging. In these examples, the reference area 88 corresponds to the compressor map 86. When the current operational point 90 lies outside the reference area 88 at a high charge air mass flow, i.e. when the turbine 50 is choking. As discussed in connection with FIG. 4a, by changing the timing of the exhaust camshaft 10 to advance closing of the exhaust valve 20 and changing the timing of the intake camshaft 12 to delay opening of the intake valve 22, the operational point 90 is moved back into the operational range of the turbine 50, i.e. the operational point 90 is moved into the reference area 88 and the compressor map 86. When the current operational point 91 lies outside the reference area 88 at a low charge air mass flow, i.e. when the turbine 50 is surging. As discussed in connection with FIG. 4b, by changing the timing of the exhaust camshaft 10 to delay closing of the exhaust valve 20 and changing the timing of the intake camshaft 12 to advance opening of the intake valve 22, the operational point 91 is moved back into the operational range of the turbine 50, i.e. the operational point 91 is moved into the reference area 88 and the compressor map 86.

Figure 5:
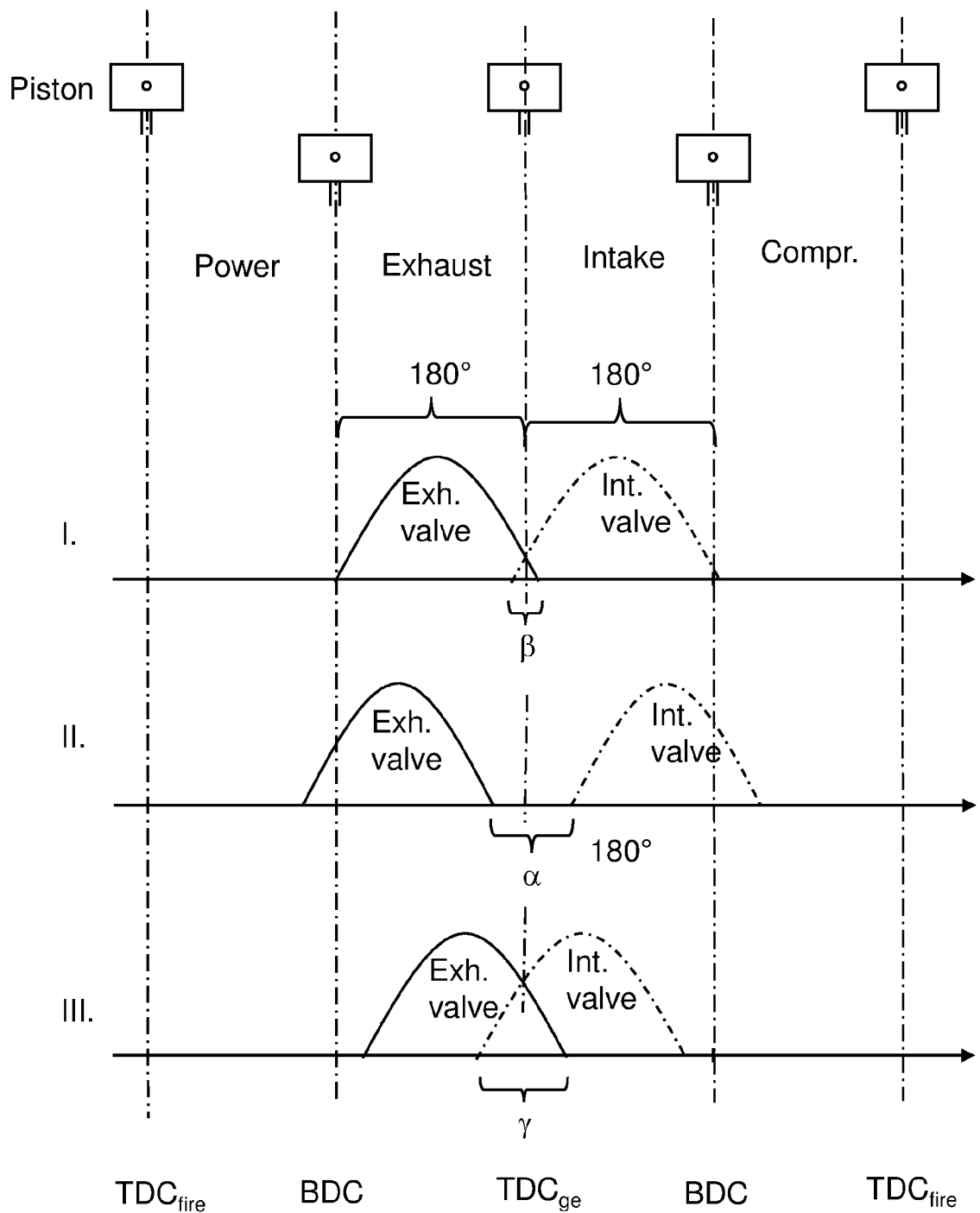
FIG. 5 illustrates diagrams over ICE operation.

FIG. 5 illustrates diagrams over the ICE 4 of FIG. 2, and control thereof in accordance with the discussion above related to FIGS. 3-4d. FIG. 5 illustrates the four strokes of a piston 26 and the movements of the exhaust valve 20 (full line) and of the intake valve 22 (dash-dotted line) during operation of the ICE 4. The crankshaft 8 of the ICE 4 rotates 720° as the four strokes of the piston 26 are performed. For each stroke, the crankshaft 8 rotates 180 degrees CA as indicated in FIG. 5.

Along line I. the opening and closing of the exhaust and intake valves 20, 22 during ordinary operation of the ICE 4 are shown. There exists an overlap between the exhaust valve 20 and the intake valve 22, i.e. both the exhaust valve 20 and the intake valve 22 are open over a rotational angle □ of the crankshaft 8.

Along line II. the opening and closing of the exhaust and intake valves 20, 22 with the change of the timing of the exhaust camshaft 10 to advance closing of the exhaust valve 20 and with the change of the timing of the intake camshaft 12 to delay opening of the intake valve 22, in accordance with some embodiments of the present invention are shown. A negative overlap is provided between the exhaust valve 20 and the intake valve 22, i.e. both the exhaust valve 20 and the intake valve 22 are closed over a rotational angle □ of the crankshaft 8.

The rotational angle □ of rotation of the crankshaft 8 in the transition between the exhaust stroke of the piston 26 and the intake stroke of the piston 26 may be at least 5 degrees. That is, the negative overlap may be at least 5 degrees CA. According to some embodiments, the angle □ of rotation of the crankshaft in the transition between the exhaust stroke of the piston and the intake stroke of the piston is within a range of 5-160 degrees CA. That is, the negative overlap may be within a range of 5-160 degrees CA.

Along line III. the opening and closing of the exhaust and intake valves 20, 22 with the change of the timing of the exhaust camshaft 10 to delay closing of the exhaust valve 20 and with the change of the timing of the intake camshaft 12 to advance opening of the intake valve 22, in accordance with some embodiments of the present invention are shown. An increased overlap is provided between the exhaust valve 20 and the intake valve 22, i.e. both the exhaust valve 20 and the intake valve 22 are open over a larger rotational angle □□ of the crankshaft 8 than during ordinary operation of the ICE 4.

In each case, i.e. a long lines I., II., and III. the length of the open period of each of the exhaust and intake valves 20, 22 remains the same. That is, the change of the timing of the exhaust and intake camshafts 10, 12 does not affect the length in degrees CA that the exhaust and intake valves 20, 22 remain open. Put differently, the valve opening times of the exhaust and intake valves 20, 22 are of constant duration before and after the change of timing of the camshafts 10, 12.

Moreover, the change of the timing of the exhaust and intake valves 20, 22 is substantially symmetrical about TDCge. That is, the absolute value of degrees CA of the change of timing is substantially the same for the exhaust valve 20 as for the intake valve 22.

Put differently, the change of the timing of the exhaust camshaft 10 to advance closing of the exhaust valve 20 in advancing CA degrees may be of an equal magnitude as the change of the timing of the intake camshaft 12 to delay opening of the intake valve 22 in delay CA degrees. Alternatively, the change of the timing of the exhaust camshaft 10 to advance closing of the exhaust valve 20 in advancing CA degrees may be of a magnitude differing within a range of maximum +/−10 CA degrees from the change of the timing of the intake camshaft 12 to delay opening of the intake valve 22 in delay CA degrees. Similarly, the change of the timing of the exhaust camshaft 10 to delay closing of the exhaust valve 20 in delay CA degrees may be of an equal magnitude as the change of the timing of the intake camshaft 12 to advance opening of the intake valve 22 in advancing CA degrees. Alternatively, the change of the timing of the exhaust camshaft 10 to delay closing of the exhaust valve 20 in delay CA degrees may be of a magnitude differing within a range of maximum +/−10 CA degrees from the change of the timing of the intake camshaft 12 to advance opening of the intake valve 22 in advancing CA degrees According to some embodiments, the change of timing of each of the camshafts 10, 12 may be variable over a range of degrees CA. Thus, the transition of the operational point of the compressor 50 of the turbocharger 14 towards the reference area 88 and/or towards the target lambda value may be finely tuned.

FIG. 6 illustrates embodiments of a method 100 of controlling timings of an exhaust camshaft and an intake camshaft of a four-stroke ICE. The ICE may be an ICE 4 comprising a control system 46 as discussed above in connection with FIGS. 1-5. Accordingly, in the following reference is also made to FIGS. 1-5.

The method 100 comprises steps of:
  determining 102 at least two parameters out of: a current turbocharger rotational speed, a current charge air mass flow, and one of a current charge air pressure or a current compressor pressure ratio,
  detecting 104 whether the at least two parameters indicate that a current operational point 90 of the compressor 50 is outside the reference area 88 at a higher charge air mass flow than a maximum charge air mass flow of the reference area 88 at a compressor pressure ratio of the current operational point 90, and in response thereto perform steps of:
  changing 106 the timing of the exhaust camshaft 10 to advance closing of the exhaust valve 20, and
  changing 108 the timing of the intake camshaft 24 to delay opening of the intake valve 22. As discussed above, in this manner, an overlap between the open exhaust and intake valves 10, 12 is reduced or a negative overlap is created, and the operational point 90 is moved towards or into the reference area 88.

According to some embodiments, the method 100 may comprise steps of:
  detecting 110 whether the at least two parameters indicate that a current operational point 91 of the compressor 50 is outside the reference area 88 at a lower charge air mass flow than a minimum charge air mass flow of the reference area at a compressor pressure ratio of the current operational point 91, and in response thereto perform steps of:
  changing 112 the timing of the exhaust camshaft 10 to delay closing of the exhaust valve 20, and
  changing 114 the timing of the intake camshaft 12 to advance opening of the intake valve 22. As discussed above, in this manner, an overlap between the open exhaust and intake valves 22, 20 is increased, and the operational point 91 is moved towards or into the reference area 88.

According to embodiments, the method 100 may comprise steps of:
  determining 116 a current turbocharger rotational speed and/or a cylinder pressure of the cylinder arrangement 6, determining 118 whether the current turbocharger rotational speed exceeds a maximum rotational speed threshold and/or the cylinder pressure exceeds a maximum cylinder pressure, and in response thereto perform steps of:
  changing 106 the timing of the exhaust camshaft 10 to advance closing of the exhaust valve 20, and
  changing 108 the timing of the intake camshaft 12 to delay opening of the intake valve 22.

As discussed above, in this manner, the turbocharger 14 and/or the ICE 4 may be prevented from being overloaded.

According to embodiments, the method 100 may comprise steps of:
  determining 120 a current lambda value,
  determining 122 whether the current lambda value is above the target lambda value or lambda value range, and in response thereto perform steps of:
    changing 106 the timing of the exhaust camshaft 10 to advance closing of the exhaust valve 20, and
    changing 108 the timing of the intake camshaft 12 to delay opening of the intake valve 22.

As discussed above, in this manner, the lambda value may be reduced.

According to embodiments, the method 100 may comprise a step of:
  determining 124 whether the current lambda value being below the target lambda value or lambda value range, and in response thereto:
    changing 112 the timing of the exhaust camshaft 10 to delay closing of the exhaust valve 20, and
    changing 114 the timing of the intake camshaft 12 to advance opening of the intake valve 22.

As discussed above, in this manner, the lambda value may be increased.

According to a further aspect, there is provided a computer program comprising instructions which, when the program is executed by a computer, causes the computer to carry out a method 100 according to any one of aspects and/or embodiments discussed herein.

One skilled in the art will appreciate that the method 100 of controlling timings of an exhaust camshaft 10 and an intake camshaft 12 of a four-stroke ICE 4 may be implemented by programmed instructions. These programmed instructions are typically constituted by a computer program, which, when it is executed in a computer or calculation unit 62, ensures that the computer or calculation unit 62 carries out the desired control, such as the method steps 102-124 according to the invention. The computer program is usually part of a computer-readable storage medium which comprises a suitable digital storage medium on which the computer program is stored.

Figure 7:
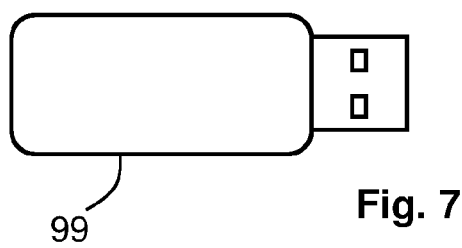
FIG. 7 illustrates embodiments of a computer-readable storage medium.

FIG. 7 illustrates embodiments of a computer-readable storage medium 99 comprising instructions which, when executed by a computer or calculation unit 62, cause the computer or calculation unit 62 to carry out the steps of the method 100 according to any one of aspects and/or embodiments discussed herein.

The computer-readable storage medium 99 may be provided for instance in the form of a data carrier carrying computer program code for performing at least some of the steps 102-124 according to some embodiments when being loaded into the one or more calculation units 62. The data carrier may be, e.g. a ROM (read-only memory), a PROM (programmable read-only memory), an EPROM (erasable PROM), a flash memory, an EEPROM (electrically erasable PROM), a hard disc, a CD ROM disc, a memory stick, an optical storage device, a magnetic storage device or any other appropriate medium such as a disk or tape that may hold machine readable data in a non-transitory manner. The computer-readable storage medium may furthermore be provided as computer program code on a server and may be downloaded to the calculation unit 62 remotely, e.g., over an Internet or an intranet connection, or via other wired or wireless communication systems.

The computer-readable storage medium 99 shown in FIG. 7 is a nonlimiting example in the form of a USB memory stick.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the invention, as defined by the appended claims.

The invention claimed is:

1. A four-stroke internal combustion engine comprising at least one cylinder arrangement, a crankshaft, an exhaust camshaft, an intake camshaft, a turbocharger, and a control system, wherein the cylinder arrangement comprises a combustion chamber, a cylinder bore, a piston configured to reciprocate in the cylinder bore and being connected to the crankshaft, an exhaust valve, and an intake valve, wherein the exhaust camshaft is configured to control the opening and closing of the exhaust valve, and the intake camshaft is configured to control the opening and closing of the intake valve, wherein the turbocharger comprises a compressor and a turbine, the turbine being arranged in an exhaust gas flow path extending from the exhaust valve, wherein a timing of the exhaust camshaft and a timing of the intake camshaft are controllable by the control system, wherein the control system is configured to:
  store a compressor map related to the compressor of the turbocharger;
  store a reference area within the compressor map;
  determine at least two parameters out of: (i) a current turbocharger rotational speed, (ii) a current charge air mass flow, and (iii) one of a current charge air pressure or a current compressor pressure ratio; and
  in response to the at least two parameters indicating that a current operational point of the compressor is outside the reference area at a higher charge air mass flow than a maximum charge air mass flow of the reference area at a compressor pressure ratio of the current operational point:
    change the timing of the exhaust camshaft to advance closing of the exhaust valve; and
    change the timing of the intake camshaft to delay opening of the intake valve.

2. The four-stroke internal combustion engine according to claim 1, wherein the control system comprises a charge air pressure sensor, and wherein one of the at least two parameters is the current charge air pressure or the current compressor pressure ratio.

3. The four-stroke internal combustion engine according to claim 1, wherein the control system comprises one or more of a turbocharger rotational speed sensor, a charge air mass flow sensor, an engine rotational speed sensor, and a charge air temperature sensor.

4. The four-stroke internal combustion engine according to claim 1, wherein the control system, in response to the at least two parameters indicating that a current operational point of the compressor is outside the reference area at a lower charge air mass flow than a minimum charge air mass flow of the reference area at a compressor pressure ratio of the current operational point, is configured to:
  change the timing of the exhaust camshaft to delay closing of the exhaust valve; and
  change the timing of the intake camshaft to advance opening of the intake valve.

5. The four-stroke internal combustion engine according to claim 1, wherein the exhaust gas flow path in its entirety extends through the turbine.

6. The four-stroke internal combustion engine according to claim 1, wherein the control system is configured to:
  determine a current turbocharger rotational speed and/or a cylinder pressure of the cylinder arrangement; and
  in response to the current turbocharger rotational speed exceeding a maximum rotational speed threshold and/or the cylinder pressure exceeding a maximum cylinder pressure:
    change the timing of the exhaust camshaft to advance closing of the exhaust valve; and
    change the timing of the intake camshaft to delay opening of the intake valve.

7. The four-stroke internal combustion engine according to claim 6 further comprising a decompression brake.

8. The four-stroke internal combustion engine according to claim 1, wherein the control system is configured to:
  store a target lambda value or lambda value range;
  determine a current lambda value; and
  in response to the current lambda value being above the target lambda value or lambda value range:
    change the timing of the exhaust camshaft to advance closing of the exhaust valve; and
    change the timing of the intake camshaft to delay opening of the intake valve.

9. The four-stroke internal combustion engine according to claim 8, wherein the control system, in response to the current lambda value being below the target lambda value or lambda value range, is configured to:
  change the timing of the exhaust camshaft to delay closing of the exhaust valve; and
  change the timing of the intake camshaft to advance opening of the intake valve.

10. The four-stroke internal combustion engine according to claim 1, wherein the change of the timing of the exhaust camshaft to advance closing of the exhaust valve in advancing crank angle degrees is of an equal magnitude, or differs within a range of maximum +/−10 crank angle degrees from, the change of the timing of the intake camshaft to delay opening of the intake valve in delay crank angle degrees.

11. A vehicle comprising a four-stroke internal combustion engine comprising at least one cylinder arrangement, a crankshaft, an exhaust camshaft, an intake camshaft, a turbocharger, and a control system, wherein the cylinder arrangement comprises a combustion chamber, a cylinder bore, a piston configured to reciprocate in the cylinder bore and being connected to the crankshaft, an exhaust valve, and an intake valve, wherein the exhaust camshaft is configured to control the opening and closing of the exhaust valve, and the intake camshaft is configured to control the opening and closing of the intake valve, wherein the turbocharger comprises a compressor and a turbine, the turbine being arranged in an exhaust gas flow path extending from the exhaust valve, wherein a timing of the exhaust camshaft and a timing of the intake camshaft are controllable by the control system, wherein the control system is configured to:
  store a compressor map related to the compressor of the turbocharger;
  store a reference area within the compressor map;
  determine at least two parameters out of: (i) a current turbocharger rotational speed, (ii) a current charge air mass flow, and (iii) one of a current charge air pressure or a current compressor pressure ratio; and
  in response to the at least two parameters indicating that a current operational point of the compressor is outside the reference area at a higher charge air mass flow than a maximum charge air mass flow of the reference area at a compressor pressure ratio of the current operational point:
    change the timing of the exhaust camshaft to advance closing of the exhaust valve; and
    change the timing of the intake camshaft to delay opening of the intake valve.

12. A method of controlling timings of an exhaust camshaft and an intake camshaft of a four-stroke internal combustion engine comprising at least one cylinder arrangement, a crankshaft, the exhaust camshaft, the intake camshaft, a turbocharger, and a control system, wherein the cylinder arrangement comprises a combustion chamber, a cylinder bore a piston configured to reciprocate in the cylinder bore and being connected to the crankshaft, an exhaust valve, and an intake valve, wherein the exhaust camshaft is configured to control the opening and closing of the exhaust valve, and the intake camshaft is configured to control the opening and closing of the intake valve, wherein the turbocharger comprises a compressor and a turbine, the turbine being arranged in an exhaust gas flow path extending from the exhaust valve, wherein the control system is configured to store a compressor map related to the compressor of the turbocharger, and to store a reference area within the compressor map, and wherein the method comprises steps of:
  determining at least two parameters out of: (i) a current turbocharger rotational speed, (ii) a current charge air mass flow, and (iii) one of a current charge air pressure or a current compressor pressure ratio;
  detecting whether the at least two parameters indicate that a current operational point of the compressor is outside the reference area at a higher charge air mass flow than a maximum charge air mass flow of the reference area at a compressor pressure ratio of the current operational point; and
  in response thereto perform steps of:
    changing the timing of the exhaust camshaft to advance closing of the exhaust valve; and
    changing the timing of the intake camshaft to delay opening of the intake valve.

13. The method according to claim 12, comprising steps of:
  detecting whether the at least two parameters indicate that a current operational point of the compressor is outside the reference area at a lower charge air mass flow than a minimum charge air mass flow of the reference area at a compressor pressure ratio of the current operational point; and
  in response thereto perform steps of:
    changing the timing of the exhaust camshaft to delay closing of the exhaust valve; and
    changing the timing of the intake camshaft to advance opening of the intake valve.

14. The method according to claim 12, comprising steps of:
  determining a current turbocharger rotational speed and/or a cylinder pressure of the cylinder arrangement;

determining whether the current turbocharger rotational speed exceeds a maximum rotational speed threshold and/or the cylinder pressure exceeds a maximum cylinder pressure; and in response thereto perform steps of:
    changing the timing of the exhaust camshaft to advance closing of the exhaust valve; and
    changing the timing of the intake camshaft to delay opening of the intake valve.

15. The method according to claim 12, wherein the control system is configured to store a target lambda value or lambda value range, and wherein the method comprises steps of:
    determining a current lambda value;
    determining whether the current lambda value is above the target lambda value or lambda value range; and
    in response thereto perform steps of:
        changing the timing of the exhaust camshaft to advance closing of the exhaust valve, and
        changing the timing of the intake camshaft to delay opening of the intake valve.

16. The method according to claim 15, comprising the steps of:
    determining whether the current lambda value being below the target lambda value or lambda value range; and
    in response thereto:
        changing the timing of the exhaust camshaft to delay closing of the exhaust valve; and
        changing the timing of the intake camshaft to advance opening of the intake valve.

17. A non-transitory computer-readable storage medium comprising computer program instructions stored thereon for controlling timings of an exhaust camshaft and an intake camshaft of a four-stroke internal combustion engine comprising at least one cylinder arrangement, a crankshaft, the exhaust camshaft, the intake camshaft, a turbocharger, and a control system, wherein the cylinder arrangement comprises a combustion chamber, a cylinder bore, a piston configured to reciprocate in the cylinder bore and being connected to the crankshaft, an exhaust valve, and an intake valve, wherein the exhaust camshaft is configured to control the opening and closing of the exhaust valve, and the intake camshaft is configured to control the opening and closing of the intake valve, wherein the turbocharger comprises a compressor and a turbine, the turbine being arranged in an exhaust gas flow path extending from the exhaust valve, wherein the control system is configured to store a compressor map related to the compressor of the turbocharger, and to store a reference area within the compressor map, said computer program instructions configured to cause one or more control devices to perform the following operations:
    determining at least two parameters out of: (i) a current turbocharger rotational speed, (ii) a current charge air mass flow, and (iii) one of a current charge air pressure or a current compressor pressure ratio;
    detecting whether the at least two parameters indicate that a current operational point of the compressor is outside the reference area at a higher charge air mass flow than a maximum charge air mass flow of the reference area at a compressor pressure ratio of the current operational point; and
    in response thereto perform steps of:
        changing the timing of the exhaust camshaft to advance closing of the exhaust valve; and
        changing the timing of the intake camshaft to delay opening of the intake valve.

* * * * *